US008578163B2

(12) United States Patent
Yao

(10) Patent No.: US 8,578,163 B2
(45) Date of Patent: Nov. 5, 2013

(54) COMMUNICATION METHOD, MESH NETWORK SYSTEM AND COMMUNICATION TERMINAL

(75) Inventor: Taketsugu Yao, Osaka (JP)

(73) Assignee: Oki Electronic Industry Co., Ltd., Tokyo (JP)

( * ) Notice: Subject to any disclaimer, the term of this patent is extended or adjusted under 35 U.S.C. 154(b) by 978 days.

(21) Appl. No.: 12/591,474

(22) Filed: Nov. 20, 2009

(65) Prior Publication Data

US 2010/0228981 A1   Sep. 9, 2010

(30) Foreign Application Priority Data

Mar. 9, 2009   (JP) ................................. 2009-055259

(51) Int. Cl.
*H04L 9/32* (2006.01)
*G06F 7/04* (2006.01)

(52) U.S. Cl.
USPC .............................................. 713/171; 726/7

(58) Field of Classification Search
USPC .............................................. 707/100; 726/7
See application file for complete search history.

(56) References Cited

U.S. PATENT DOCUMENTS

| | | | | |
|---|---|---|---|---|
| 6,684,215 | B1 * | 1/2004 | Saracco | 707/702 |
| 7,356,329 | B2 * | 4/2008 | Willey et al. | 455/410 |
| 2008/0046732 | A1 * | 2/2008 | Fu et al. | 713/171 |
| 2008/0076420 | A1 * | 3/2008 | Khetawat et al. | 455/435.1 |

FOREIGN PATENT DOCUMENTS

| | | | |
|---|---|---|---|
| JP | 2005-278044 A | 10/2005 | |
| JP | 2005278044 A | * 10/2005 | ................ H04L 9/08 |

* cited by examiner

*Primary Examiner* — Krista Zele
*Assistant Examiner* — Margishi Desai
(74) *Attorney, Agent, or Firm* — Rabin & Berdo, P.C.

(57) ABSTRACT

A communication method in which an operation, such as authentication, required when a new communication terminal participates in a mesh network is carried out in a more efficient manner. A second communication terminal that has already established an adjacent communication link with at least two first communication terminals, out of a plurality of communication terminals, distributes an adjacent terminal list including terminal identifiers of the first communication terminals along with a temporal key generated by the second communication terminal. One of the first communication terminals that received the adjacent terminal list and the temporal key distributes adjacent registration information, which is generated using a second temporal key. The other one of the first communication terminals that received both the adjacent terminal list and the adjacent registration information determines whether the terminal identifier of one of the first communication terminals is included in the adjacent terminal list, and whether the first temporal key distributed along with the adjacent terminal list matches with the second temporal key used for generating the adjacent registration information. If both determination results are affirmative, one of the first communication terminals is authenticated.

14 Claims, 10 Drawing Sheets

——— SAFE ADJACENT RELATIONSHIP

- - - - IN COMMUNICABLE RANGE BUT NOT IN SAFE ADJACENT RELATIONSHIP

FIRST COMMUNICATION TERMINAL: A, C, D, E, F, H

SECOND COMMUNICATION TERMINAL: B

FIG. 4

ADJACENT TERMINAL TABLE OF COMMUNICATION TERMINAL A    131

| TERMINAL IDENTIFIER | COMMON KEY | INCOMING COUNTER VALUE |
|---|---|---|
| B | $K_B$ | 0005 |

FIG. 5

ADJACENT TERMINAL CANDIDATE TABLE OF COMMUNICATION TERMINAL A    132

| TERMINAL IDENTIFIER OF ADJACENT CANDIDATE | KEY IDENTIFIER OF TEMPORAL KEY | TEMPORAL KEY |
|---|---|---|
| C | $ID_{B1}$ | $TK_{B1}$ |
| D | $ID_{B1}$ | $TK_{B1}$ |
| E | $ID_{B1}$ | $TK_{B1}$ |
| F | $ID_{B1}$ | $TK_{B1}$ |
| H | $ID_{B1}$ | $TK_{B1}$ |

ADJACENT TERMINAL TABLE OF COMMUNICATION TERMINAL B

| TERMINAL IDENTIFIER | COMMON KEY | INCOMING COUNTER VALUE |
|---|---|---|
| A | $K_A$ | 0005 |
| C | $K_C$ | 0032 |
| D | $K_D$ | 0022 |
| E | $K_E$ | 0015 |
| F | $K_F$ | 0034 |
| H | $K_H$ | 0036 |

——— SAFE ADJACENT RELATIONSHIP

FIRST COMMUNICATION TERMINAL: A, C, D, E, F, H
SECOND COMMUNICATION TERMINAL: B

COMMUNICATION METHOD, MESH NETWORK SYSTEM AND COMMUNICATION TERMINAL

BACKGROUND OF THE INVENTION

1. Field of the Invention

The present invention relates to a communication method for a mesh network system. The mesh network includes a plurality of communication terminals disposed in a mesh configuration such that adjacent communication terminals can perform data communication with each other by establishing an adjacent relationship for data communication. The present invention also relates to such mesh network system and a communication terminal used in the mesh network system.

2. Description of the Related Art

A mesh network is a communication network connected in a mesh so that communication terminals communicate with each other. An individual communication terminal, that participates in the mesh network, can communicate with other communication terminals within its communicable range (adjacent terminals). When this communication terminal wants to communicate with a remote communication terminal beyond its communicable range, multi-hop communication is performed, i.e., intermediate communication terminals between the data-sending terminal (sender) and data-receiving terminal (recipient) relay the data using a so called "bucket brigade system." In this way, in the case of a mesh network, an individual communication terminal participating in the mesh network is only required to communicate with adjacent terminals in the same network, and therefore requires only reduced output for data communication. Even if a communication terminal between the data-sending terminal and the data-receiving terminal is damaged or removed, an alternate path can be easily secured, and failure can be more easily handled compared with such a conventional network as a start network, in which communication is disabled if a communication terminal at the center fails.

A problem of a mesh network concerns the authentication of communication terminals to participate in the network, and sharing a key. A communication terminal to participate in a network must be authenticated and communication content must be protected by a key since there is concern that the communication data may be intercepted or altered, or data may be illegally accessed or a relay transfer may be rejected. In order to eliminate such possibilities, each communication terminal, to participate, authenticates at least the adjacent communication terminals and shares a key so that each communication terminal establishes a safe adjacent relationship in which communication is not allowed with communication terminals which are not registered as an adjacent terminal.

According to a known technology to establish such a safe adjacent relationship, a communication terminal which participates in a network repeats authentication and shares a key for each adjacent communication terminal. For example, Japanese Patent Application Kokai (Laid-Open) No. 2005-278044 discloses a method used in an ad hoc network, wherein a wireless communication terminal, which relays data, sends a common key to another wireless communication terminal within the transmission range. If the wireless communication terminal which has received the common key relays the data, this common key is transferred to a next wireless communication terminal.

SUMMARY OF THE INVENTION

According to Japanese Patent Application Kokai No. 2005-278044, a communication terminal, to participate in a network, must repeat authentication and share a key for each adjacent communication terminal. It is particularly inefficient if there are many adjacent communication terminals which are densely installed, or if the number of communication terminals involved in the network increase because of new participants.

An object of the present invention is to provide a communication method that can carry out an operation, such as authentication, required when a new communication terminal participates in a mesh network, in a more efficient manner.

Another object of the present invention is to provide a mesh network system that includes a plurality of communication terminals disposed in a mesh configuration, and enables authentication and other operations required when a new communication terminal participates in the mesh network, in an efficient manner.

Still another object of the present invention is to provide a communication terminal used in such mesh network system.

According to a first aspect of the present invention, there is provided a communication method for a mesh network system. The mesh network system includes a plurality of communication terminals. In the mesh network system, an adjacent communication link is established after authenticating a counterpart communication terminal between adjacent communication terminals, and then wireless multi-hop communication becomes possible when a plurality of such adjacent communication links are established. The communication method includes an adjacent terminal list distribution step in which a second communication terminal, which has been registered as a safe adjacent terminal by at least two first communication terminals, out of the communication terminals of the mesh network, distributes an adjacent terminal list including terminal identifiers of the first communication terminals, along with a temporal key generated by the second communication terminal. The communication method also includes an adjacent registration information distribution step in which one of the first communication terminals that has received the adjacent terminal list and the temporal key distributers adjacent registration information generated using the temporal key. The communication method also includes an adjacent terminal authentication step in which if the other one of the first communication terminals that has received both the adjacent terminal list and the adjacent registration information confirms that the terminal identifier of the one of the first communication terminals is included in the adjacent terminal list and that the temporal key distributed along with the adjacent terminal list matches with the temporal key used for generating the adjacent registration information, then the one of the first communication terminals is authenticated.

An adjacent relationship can be safely and efficiently established without repeating mutual authentication between each communication terminal and adjacent candidate communication terminal, and without requiring each communication terminal to recognize an adjacent terminal device to its adjacent terminal device. Therefore an operation (e.g., such as authentication) required when a new communication terminal participates in a mesh network can be done more efficiently.

According to a second aspect of the present invention, there is provided a mesh network system that includes a plurality of communication terminals. In the mesh network system, an adjacent communication link is established after authenticating a counterpart communication terminal between adjacent terminals and the wireless multi-hop communication becomes possible when a plurality of such adjacent communication links are established. Any of the communication terminals may serve as a second communication terminal that has an adjacent terminal list distribution circuit for distributing, as a second communication terminal, an adjacent terminal list including terminal identifiers of at least two first communication terminals, along with a temporal key that this second communication terminal has generated. One of the first communication terminals has an adjacent registration information distribution circuit for distributing the adjacent registration information generated using the temporal key when the adjacent terminal list and the temporal key are received. The other of the first communication terminals has an adjacent terminal authentication circuit for authenticating the one of the first communication terminals by confirming that the terminal identifier of the one of the first communication terminals is included in the adjacent terminal list, and that a temporal key distributed along with the adjacent terminal list matches with the temporal key used for generating the adjacent registration information, when both of the adjacent terminal list and the adjacent registration information are received.

These and other objects, aspects and advantages of the present invention will become apparent to those skilled in the art from the following detailed description when read and understood in conjunction with the appended claims and drawings.

BRIEF DESCRIPTION OF THE DRAWINGS

FIG. 4 shows an example of an adjacent terminal table managed (administered) by a communication terminal A;

FIG. 5 shows an example of an adjacent terminal candidate table managed (administered) by the communication terminal A;

FIG. 7 shows an example of an adjacent terminal table managed by a communication terminal B;

DETAILED DESCRIPTION OF THE INVENTION

Embodiments of the present invention will now be described in detail with reference to the accompany drawings. It should be noted that the present invention is not limited to the following embodiments.

Figure 1:
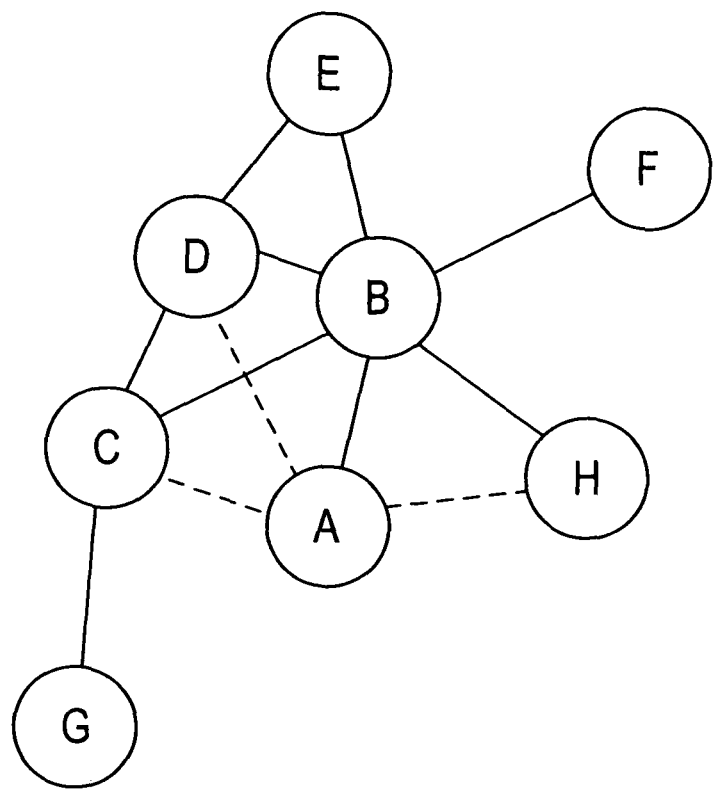
FIG. 1 diagrammatically depicts an initial state of a mesh network formed by a plurality of communication terminals.

Referring to FIG. 1, an example of a mesh network formed by a plurality of communication terminals will be described. In FIG. 1, a solid line indicates that a safe adjacent relationship has been established between communication terminals. A broken line indicates that a safe adjacent relationship has not yet been established between communication terminals, although terminals are located in a communicable range. For example, the communication terminal A has established a safe adjacent relationship with the communication terminal B, but has not yet established a safe adjacent relationship with the communication terminals C, D and H. The communication terminal A is not in a communicable range with the communication terminal G. The communication terminal B has established a safe adjacent relationship with the communication terminals A, C, D, E, F and H. The communication terminal C has established a safe adjacent relationship with the communication terminals B, D and G, but has not yet established a safe adjacent relationship with the communication terminal A.

"Safe adjacent relationship" refers to a relationship in which an adjacent communication link is established, both terminals authenticate each other as a safe adjacent terminal, and share a common key to encrypt or authenticate communication content. "Safe adjacent terminal" refers to a communication terminal that is in a communicable range, and holds a common key for decoding or authenticating received communication content. The common key is a key that is assigned to each communication terminal. The common key could be a network key which is shared by the entire network, or could be a circle key which is shared within a communicable range in adjacent relationships. If a safe adjacent relationship has been established using the circle key, a communication terminal in the circle can safely perform broadcast communication for all the adjacent communication terminals thereof, or can safely perform unicast communication to each adjacent communication terminal thereof.

In the following description, a communication terminal which attempts to establish a safe adjacent relationship is referred to as a "first communication terminal", and a communication terminal with which a safe adjacent relationship has already been established in such an establishment attempt is referred to as a "second communication terminal". The first communication terminal and the second communication terminal are adjacent communication terminals. One communication terminal may serve as the first communication terminal and/or the second communication terminal. Alternatively, the first communication terminal and the second communication terminal may be implemented as separate communication terminals.

Figure 2:
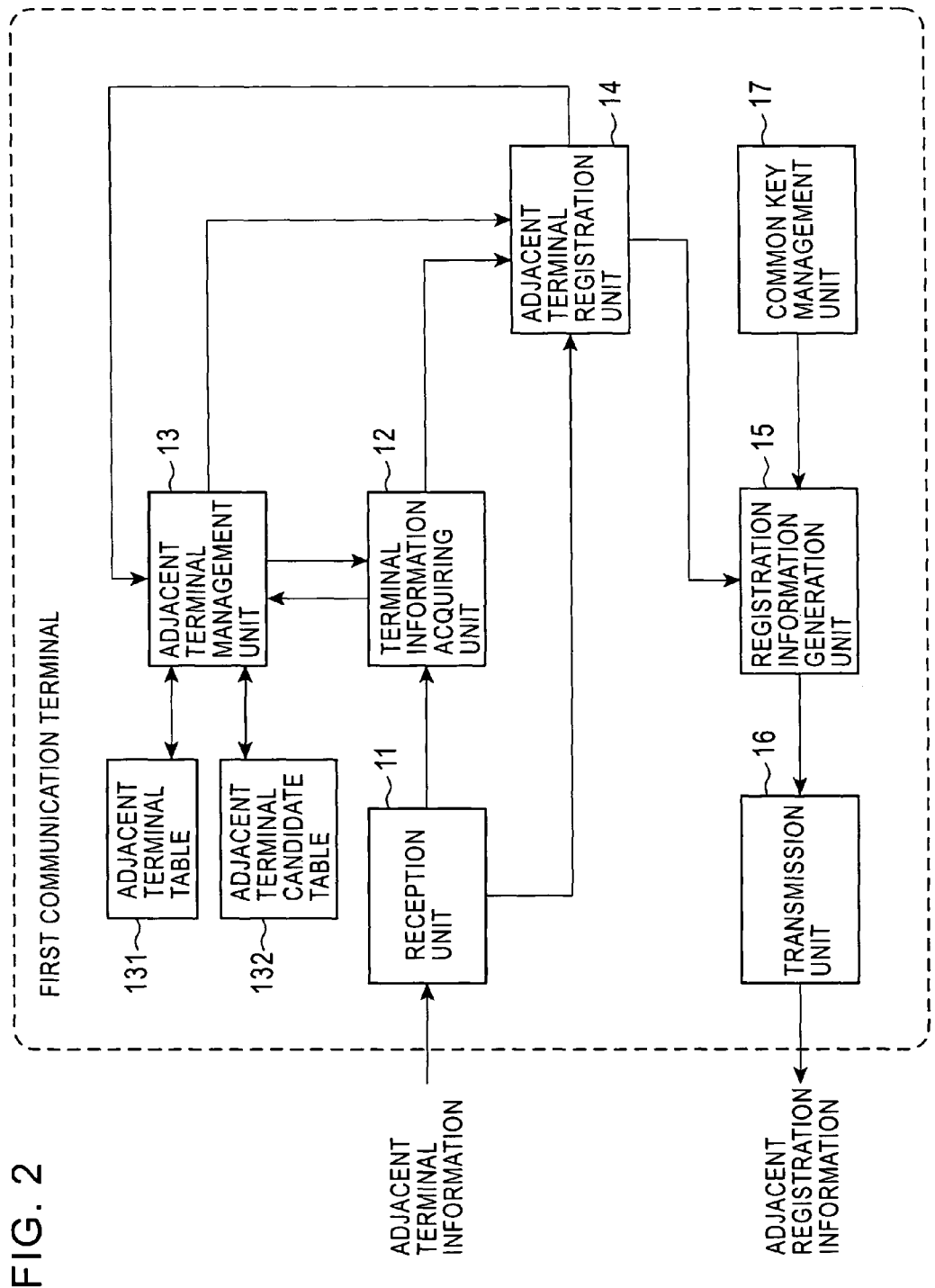
FIG. 2 is a block diagram depicting an internal configuration of a first communication terminal according to an embodiment of the present invention.

FIG. 2 illustrates an internal configuration of the first communication terminal. In illustrated in the drawing, the first communication terminal has a terminal information acquisition unit 12, adjacent terminal management unit 13, adjacent terminal table 131, adjacent terminal candidate table 132, adjacent terminal registration unit 14, common key management unit 17, registration information generation unit 15, reception unit 11 and transmission unit 16.

The terminal information acquisition unit 12 decodes and authenticates adjacent terminal information provided by the reception unit 11, and safely acquires an adjacent terminal list, a temporal key and a key identifier of a second communication terminal, which is the transmission source of the adjacent terminal information. The terminal information acquisition unit 12 provides the terminal identifier of the second communication terminal, which is the transmission source of the adjacent terminal information, to the adjacent terminal management unit 13, and receives a common key to decode and authenticate the information corresponding to this second communication terminal, from the adjacent terminal management unit 13. It should be noted that decoding and authentication need not be executed if an error message is received from the adjacent terminal management unit 13.

The terminal information acquisition unit 12 decodes and authenticates the adjacent terminal information provided by the reception unit 11 using a common key provided by the adjacent terminal management unit 13. If decoding and authentication are successfully completed, the terminal information acquisition unit 12 acquires the adjacent terminal list of the second communication terminal as well as a temporal key and a key identifier thereof, and sends the acquired adjacent terminal list, temporal key and key identifier to the adjacent terminal registration unit 14. The terminal identifiers of the communication terminals listed in the adjacent terminal list may be a MAC address, or a network address assigned when participating in a network. The temporal key and the key identifier thereof will be described below when the temporal key generation unit 29 of the second communication terminal is described.

The adjacent terminal management unit 13 is configured to manage (administer) information on communication terminals with which a safe adjacent relationship has already been established. The adjacent terminal management unit 13 manages this information by holding the terminal identifiers of adjacent communication terminals and security information on the communication terminals, such as a common key, in the adjacent terminal table 131. FIG. 4 shows an example of the adjacent terminal table 131 managed by the communication terminal A (see FIG. 1). The security information may include a counter value to prevent a replay attack, in addition to a common key.

Upon receiving a terminal identifier of a communication terminal from the terminal information acquisition unit 12, the adjacent terminal management unit 13 refers to the adjacent terminal table 131, and returns a common key corresponding to this terminal identifier. If the received terminal identifier is not found in the adjacent terminal table 131, the adjacent terminal management unit 13 responds with an error message. The adjacent terminal management unit 13 also sends a currently managed adjustment terminal list to the adjacent terminal registration unit 14. When the adjacent terminal management unit 13 receives a new terminal identifier and security information, such as a common key, of a first communication terminal from the adjacent terminal registration unit 14, the adjacent terminal management unit 13 holds and manages the information of this first communication terminal in the adjacent terminal table 131.

The adjacent terminal registration unit 14 determines whether another first communication terminal should be registered as an adjacent terminal device. The adjacent terminal registration unit 14 receives adjacent terminal information including an adjacent terminal list of second communication terminals, as well as a temporal key and a key identifier thereof, from the terminal information acquisition unit 12. The adjacent terminal registration unit 14 compares the adjacent terminal list from this second communication terminal with its own adjacent terminal list received from the adjacent terminal management unit 13 (adjacent terminal table 131), and determines first communication terminals not included in its own adjacent terminal list, excluding itself, as adjacent terminal candidates. The adjacent terminal registration unit 14 then holds and manages terminal identifiers of these first communication terminals, and temporal keys and key identifiers thereof of these second communication terminals in the adjacent terminal candidate table 132. FIG. 5 shows an example of the adjacent terminal candidate table 132 managed by the communication terminal A (see FIG. 1).

When the adjacent terminal registration unit 14 receives the adjacent registration information and terminal identifier of a first communication terminal, which sent this information, from the reception unit 11, the adjacent terminal registration unit 14 first checks whether the terminal identifier of this first communication terminal is managed as an adjacent terminal candidate. The detail of the adjacent registration information will be described when the registration information generation unit 15 is described. If this terminal identifier is managed as an adjacent terminal candidate, the adjacent terminal registration unit 14 checks whether there is a temporal key having a key identifier the same as the key identifier of the temporal key included in the adjacent registration information among the temporal keys being managed. If there is a temporal key having the same key identifier, the adjacent terminal registration unit 14 decodes and authenticates the adjacent registration information using this temporal key. If the decoding and authentication are completed successfully, and the terminal identifier of the first communication terminal, included in the acquired adjacent registration information, matches the terminal identifier of the first communication terminal (i.e., a transmission source of the adjacent registration information), the adjacent terminal registration unit 14 determines that the security information, such as a common key, included in the acquired adjacent registration information, is the security information of this first communication terminal, and determines that this first communication terminal is the adjacent terminal. The adjacent terminal registration unit 14 sends the terminal identifier, the common key and the security information of the first communication terminal, determined as an adjacent terminal, to the adjacent terminal management unit 13. The adjacent terminal registration unit 14 also sends the temporal key and the key identifier thereof, provided by the terminal information acquisition unit 12, to the registration information generation unit 15.

The common key management unit 17 is adapted to manage the security information, such as a common key of its communication terminal (i.e., the first communication terminal concerned; FIG. 2). In addition to a common key, the security information may include a counter value for preventing a replay attack. The common key management unit 17 manages and sends security information to the registration information generation unit 15.

Figure 6:
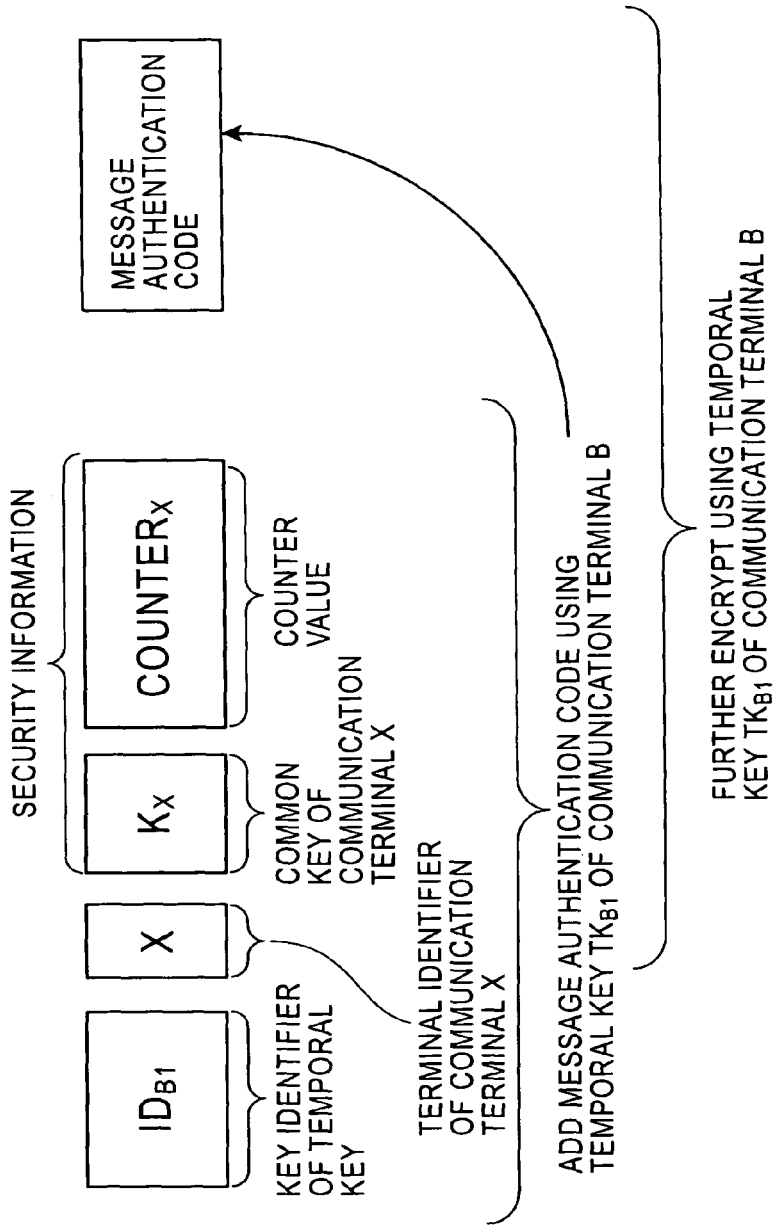
FIG. 6 illustrates an example of adjacent registration information.

For the key identifier of the temporal key provided by the adjacent terminal registration unit 14, the terminal identifier of the communication terminal and such security information as a common key, provided by the common key management unit 17, the registration information generation unit 15 generates adjacent registration information using this temporal key. For example, the registration information generation unit 15 generates a message authentication code (MAC) using the temporal key for a data string linking the key identifier of the temporal key, the terminal identifier of the communication terminal, and such security information as a common key. The registration information generation unit 15 also generates adjacent registration information by encrypting the communication terminal identifier, security information and message authentication code, using this temporal key. The reason why the key identifier of the temporal key is not encrypted is because a decoder should be able to specify a key for decoding. The reason why the security information such as the common key is encrypted is because a third party, who does not know the temporal key, should not be able to illegally obtain the security information. The message authentication code is used by a communication terminal, which has received the adjacent registration information, to authenticate that the transmission source of this adjacent registration information is the communication terminal itself, and content of the adjacent registration information is not altered but is in fact valid. FIG. 6 shows adjacent registration information which is generated by the communication terminal X (X: an arbitrary communication terminal) using the temporal key $TK_{B1}$ of the communication terminal B (see FIG. 1). The registration information generation unit 15 sends the generated adjacent registration information to the transmission unit 16.

The reception unit 11 is adapted to receive adjacent terminal information from another first communication terminal and send the adjacent terminal information to the terminal information acquisition unit 12. The reception unit 11 also sends the adjacent registration information to the adjacent terminal registration unit 14. The transmission unit 16 is adapted to transmit the adjacent registration information, provided by the registration information generation unit 15, to another first communication terminal.

Figure 3:
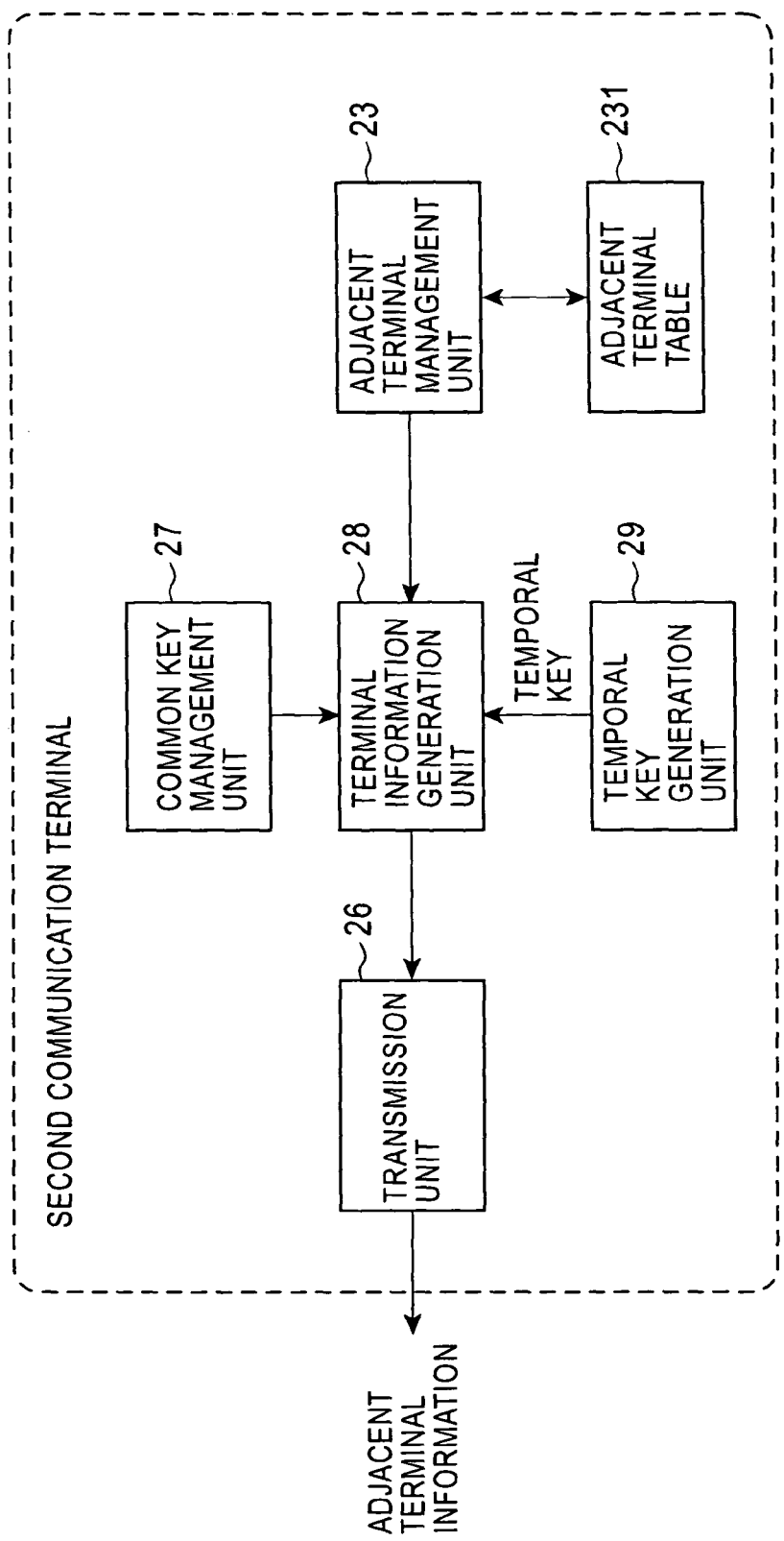
FIG. 3 is a block diagram of an internal configuration of a second communication terminal according to the embodiment.

FIG. 3 shows an internal configuration of a second communication terminal according to the present embodiment. The second communication terminal has an adjacent terminal management unit 23, adjacent terminal table 231, common key management unit 27, temporal key generation unit 29, terminal information generation unit 28 and transmission unit 26.

The adjacent terminal management unit 23 is adapted to manage information on a communication terminal with which a safe adjacent relationship has already been established. The adjacent terminal management unit 23 holds a terminal identifier of an adjacent first communication terminal and such security information as a common key thereof in the adjacent terminal table 231, and manages this information. The security information may include not only a common key but also a counter value for preventing a replay attack. FIG. 7 shows an adjacent terminal table 231 managed by the communication terminal B (see FIG. 1). The adjacent terminal management unit 23 supplies an adjacent terminal list, including the information on the adjacent terminals managed by the second communication terminal B itself, to the terminal information generation unit 28. The adjacent terminal list includes terminal identifiers of those communication terminals which will become adjacent terminals of the second communication terminal B.

The common key management unit 27 is adapted to manage such security information as a common key assigned to the communication terminal. The security information includes not only the common key, but also a counter value for preventing a replay attack. The common key management unit 27 supplies the security information to the terminal information generation unit 28.

The temporal key generation unit 29 is adapted to generate a temporal key and a key identifier thereof. The temporal key to be generated may be a bit string prepared by a pseudo-random number generator. The key identifier is an identifier for a third party to specify the temporal key. The key identifier may be a bit string generated by a pseudo-random number generator. Alternatively, the key identifier may be a combination of the above-mentioned bit string and the terminal identifier of the second communication terminal B, in order to avoid collision between key identifiers that has been generated by other first communication terminals. The temporal key generation unit 29 sends the generated temporal key and the key identifier thereof to the terminal information generation unit 28.

Figure 8:
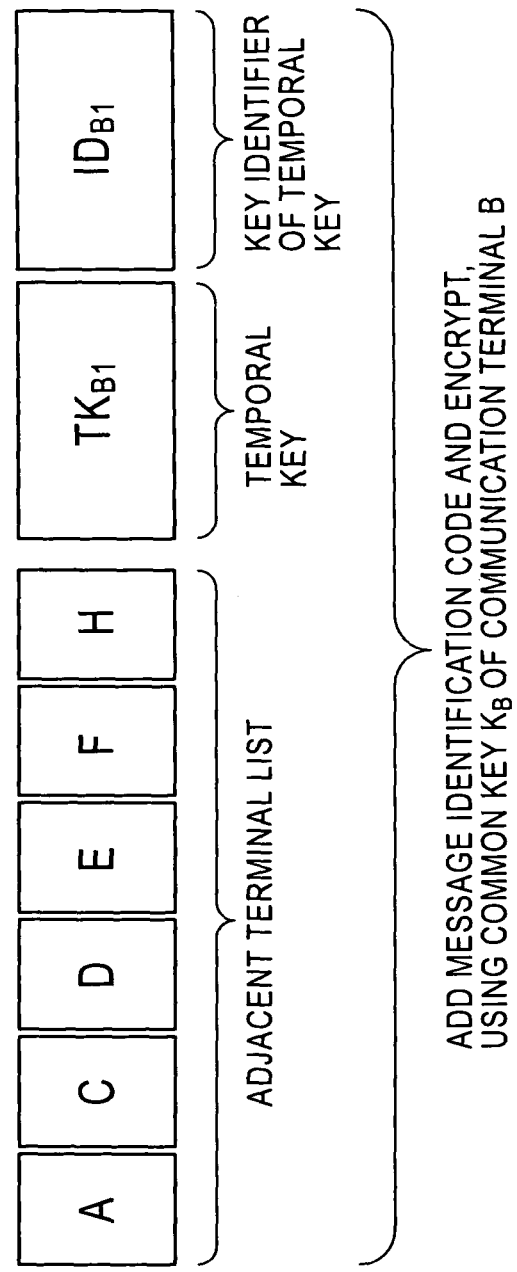
FIG. 8 illustrates an example of adjacent terminal information generated by the communication terminal B.

The terminal information generation unit 28 is configured to generate the encrypted adjacent terminal information to which the message authentication code is appended. To this end, the terminal information generation unit 28 encrypts the adjacent terminal list provided by the adjacent terminal management unit 23 and the temporal key and key identifier thereof provided by the temporal key generation unit 29, using the security information (e.g., common key) provided by the common key management unit 27, and attaches the message authentication code. In the adjacent terminal information, it is preferable that a message authentication code generated using a common key and a counter value provided by the common key management unit 27 is attached to a data string linking an adjacent terminal list, a temporal key and a key identifier thereof, and all of this information is encrypted. At least the temporal key, included in the adjacent terminal information, must be encrypted so as to prevent interception by a third party. The message authentication code is used for a communication terminal, which received the adjacent terminal information, to authenticate that the transmission source of this adjacent terminal information is the communication terminal B itself, and that the content of the adjacent registration information has not been altered and is valid. FIG. 8 depicts adjacent terminal information generated by the communication terminal B. The terminal information generation unit 28 sends the generated adjacent terminal information to the transmission unit 26. The transmission unit 26 sends the adjacent terminal information provided by the terminal information generation unit 28 to another first communication terminal.

Figure 9:
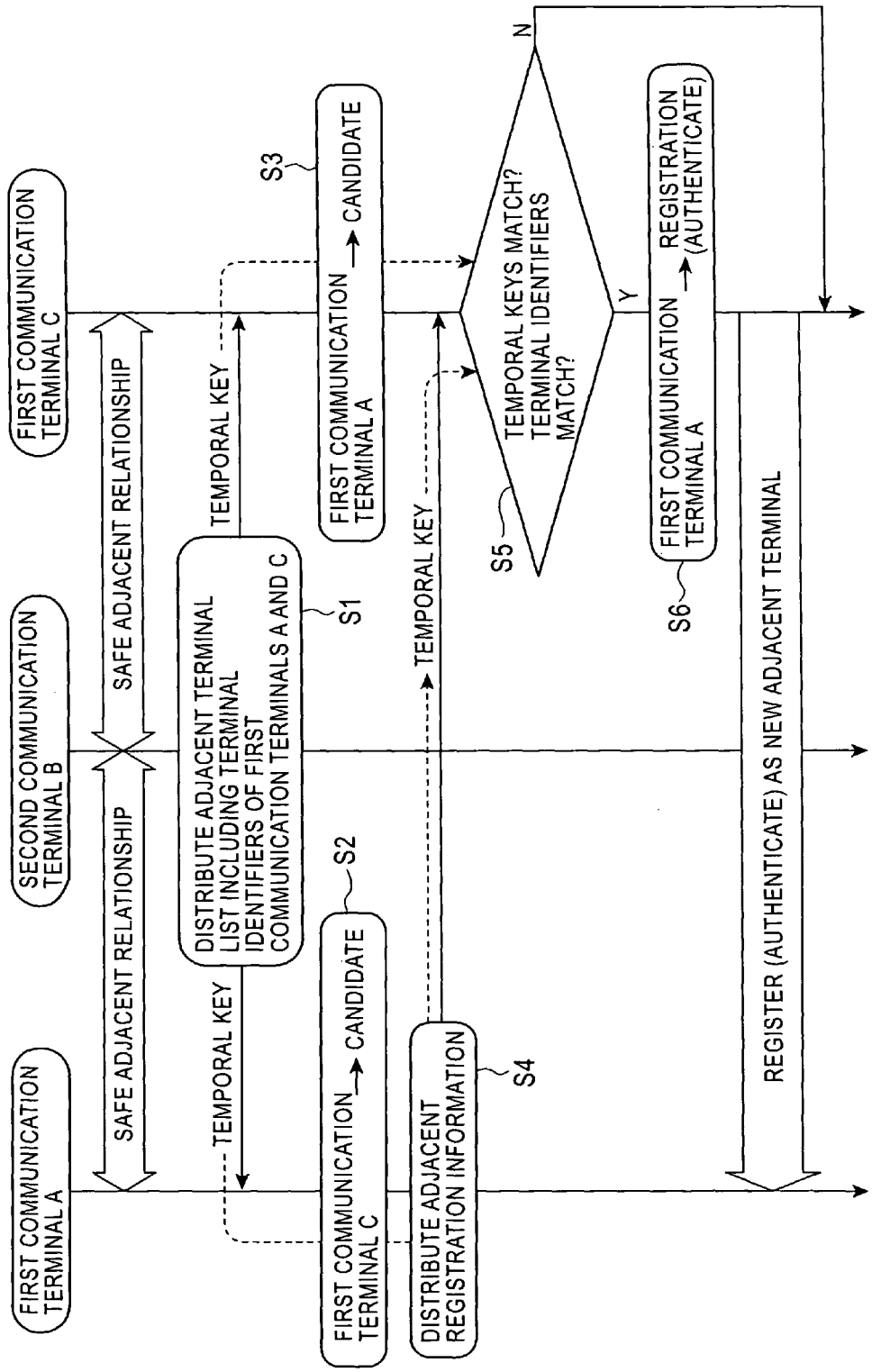
FIG. 9 is a sequence diagram depicting a basic operation of a communication method according to the present invention.

FIG. 9 illustrates a basic operation according to the communication method of the present invention. The present invention is characterized in that one first communication terminal in question can establish a safe adjacent relationship with another first communication terminal, using a second communication terminal with which the first communication terminal in question has already established a safe adjacent relationship.

As a perquisite for being registered as an adjacent terminal, it is necessary that each one of the two first communication terminals A and C has already established a safe adjacent relationship with the second communication terminal B, and the communication terminal C exists in a communicable range of the communication terminal A.

Firstly the second communication terminal B distributes an adjacent terminal list including the terminal identifiers of the first communication terminals A and C, with which the second communication terminal B has already established a safe adjacent relationship, respectively (step S1). A temporal key and a key identifier thereof of the second communication terminal B are assigned to the adjacent terminal list to be distributed.

Then each of the first communication terminals A and C respectively determines that the first communication terminals, C and A, which are communication terminals included in the adjacent terminal list, and which are not yet in a safe adjacent relationship, are new adjacent terminal candidates (steps S2 and S3).

The first communication terminal A generates adjacent registration information including the terminal identifier of the first communication terminal A itself, and distributes this information to the first communication terminal C, which is in a communicable range (step S4). The adjacent registration information to be distributed is generated using a temporal key generated by the second communication terminal B.

According to the adjacent registration information from the first communication terminal A, the first communication terminal C determines whether the adjacent registration information has been generated using the temporal key, which the second communication terminal assigned to the adjacent terminal list. The first communication terminal C also determines whether the terminal identifier included in this adjacent registration information matches with the terminal identifier of the communication terminal which was determined as a new adjacent terminal candidate in step S3 (step S5). If there is no match, no processing is performed.

If it is determined in step S5 that the temporal keys and terminal identifiers of both terminals match, on the other hand, the first communication terminal C authenticates the first communication terminal A, based on the fact that the first communication terminal A is an adjacent terminal candidate and knows the temporal key generated by the second communication terminal. The first communication terminal C then registers (authenticates) the first communication terminal A as a new adjacent terminal (step S6).

By the first communication terminal C repeating an operation from step S4 to step S6 for the first communication terminal A, a safe adjacent relationship is established between the first communication terminal A and the first communication terminal C.

The adjacent registration information distributed from the first communication terminal A may include a shared key of the first communication terminal A. In this case, the first communication terminal C authenticates the first communication terminal A and shares the key.

Figure 10:
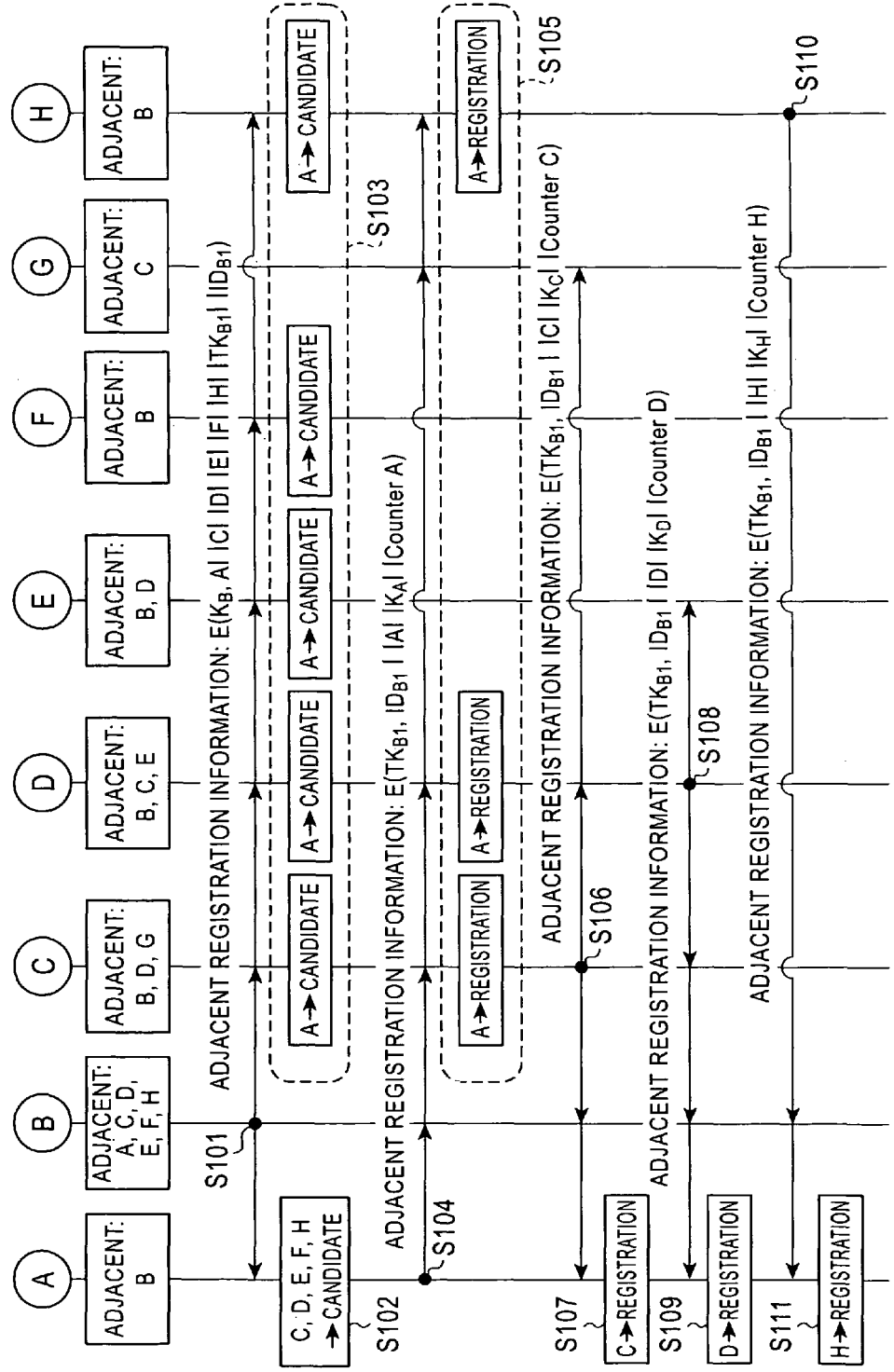
FIG. 10 is a sequence diagram depicting a detailed operation of a communication method according to the present invention.

FIG. 10 illustrates a detailed procedure of the communication according to the present invention. This is an example when a communication terminal A (first communication terminal) and communication terminals C, D and H (all first communication terminals) establish safe adjacent relationships using a communication terminal B (second communication terminal). The perquisite is that the communication terminal A has established a safe adjacent relationship with the communication terminal B by a certain method, as shown in FIG. 1. The communication terminal A has not yet established a safe adjacent relationship with the communication terminals C, D, G and H, although these terminals C, D, G and H are within a communicable range of the communication terminal A. The operation of a mesh network system, according to the present embodiment, is divided into two major phases, namely, an adjacent terminal information notification phase and an adjacent terminal registration phase.

<Adjacent Terminal Information Notification Phase>

In step S101, the terminal information generation unit 28 of the communication terminal B (second communication terminal) generates adjacent terminal information by encrypting terminal identifiers A, C, D, E, F and H of the first communication terminal with which safe adjacent relationships have already been established, and a temporal key $TK_{B1}$ and a key identifier $ID_{B1}$ thereof, generated by the temporal key generation unit 29, using a key $K_B$ of the communication terminal B and attaching a message authentication code to the resulting information. The terminal information generation unit 28 then sends the adjacent terminal information to other first communication terminals C, D, E, F and H (if the first communication terminal A is the starting terminal). In FIG. 10, the adjacent registration information E (K, X) indicates that the data string X is encrypted and a message authentication code is attached, using a common key K.

The terminal information acquisition unit 12 of the communication terminals A, C, D, E, F and H acquires the key $K_B$ of the communication terminal B, which is the transmission source communication terminal of the adjacent terminal information, from the adjacent terminal management unit 13 (adjacent terminal table 131). The terminal information acquisition unit 12 then decodes and authenticates the key $K_B$. Upon completing the decoding and authentication, the adjacent terminal list "A, C, D, E, F, and H" included in the adjacent terminal information, the temporal key $TK_{B1}$ and the key identifier $ID_{B1}$ thereof are sent to the adjacent terminal registration unit 14.

In step S102, the adjacent terminal registration unit 14 of the communication terminal A (first communication terminal) compares the adjacent terminal list, provided by the adjacent terminal management unit 13 (adjacent terminal table 131) with the other adjacent terminal list in the adjacent terminal information from the communication terminal B, which is provided by the reception unit 11, and regards the communication terminals C, D, E, F and H as the adjacent terminal candidates. The candidates are those terminals which are not managed in the adjacent terminal management unit 13 of the communication terminal A, and do not include the communication terminal A itself. The adjacent terminal registration unit 14 of the communication terminal A holds the terminal identifiers, temporal keys $TK_{B1}$ and key identifiers $ID_{B1}$ of these communication terminals (candidate terminals), in the adjacent terminal candidate table 132 of the communication terminal A.

In step S103, each of the adjacent terminal registration units 14 of the communication terminals C, D, E, F and H regards the communication terminal A, which is not managed by the adjacent terminal management units 13 of the communication terminals C, D, E, F and H, as an adjacent terminal candidate. Each of the adjacent terminal registration units 14 of the communication terminals C, D, E, F and H stores the terminal identifier, temporal key $TK_{B1}$ and key identifier $ID_{B1}$ thereof of the communication terminal A in the adjacent terminal candidate table 132 of each of the communication terminals C, D, E, F and H.

<Adjacent Terminal Registration Phase>

In step S104, the registration information generation unit 15 of the communication terminal A (first communication terminal) encrypts the identifier A of the communication terminal A, security information (common key $K_A$ and counter value $Counter_A$) of the communication terminal A, which is managed by the common key management unit 17, and the key identifier $ID_{B1}$ of the temporal key provided by the adjacent terminal registration unit 14, using the temporal key $TK_{B1}$ provided by the adjacent terminal registration unit 14, adds a message authentication code, and sends the resulting data to the other communication terminals.

In step S105, each of the adjacent terminal registration units 14 of the communication terminals C, D and H (first communication terminal) confirms that the transmission source of the adjacent registration information provided by the reception unit 11 is the communication terminal A managed in the adjacent terminal candidate table, and decodes and authenticates this adjacent registration information using the temporal key $TK_{B1}$ indicated (represented) by the key identifier $ID_{B1}$. Upon successful decoding and authentication, the adjacent terminal registration unit 14 determines that the communication terminal A, which is the transmission source of this adjacent registration information, is the adjacent terminal, and the adjacent terminal management unit 13 registers and manages the terminal identifier and security information of the communication terminal A (key $K_A$ and counter value $Counter_A$) in the adjacent terminal table 131.

The communication terminals E and F, which are not in a communicable range of the communication terminal A, do not perform any processing, since the communication terminals E and F cannot receive the adjacent registration information issued by the communication terminal A. The adjacent terminal registration unit 14 of the communication terminal G confirms that the transmission source of the adjacent registration information provided by the reception unit 11 is not a communication terminal managed in the adjacent terminal candidate table 132, and does not have the common key indicated by the key identifier $ID_{B1}$ of the decoding key. The adjacent terminal registration unit 14 of the communication terminal G then discards the provided adjacent registration information.

The communication terminals C, D and H notify the adjacent registration information in a similar manner to that performed by the communication terminal A.

In step S106, the registration information generation unit 15 of the communication terminal C (first communication terminal) encrypts the terminal identifier C of the communication terminal C, security information (common key $K_C$ and counter value $Counter_C$) of the communication terminal C, which is managed by the common key management unit 17, and the key identifier $ID_{B1}$ of the temporal key provided by the adjacent terminal registration unit 14, using the temporal key $TK_{B1}$ provided by the adjacent terminal registration unit 14, adds a message authentication code, and sends the resulting data to the other communication terminals.

In step S107, the adjacent terminal registration unit 14 of the communication terminal A (first communication terminal) confirms that the transmission source of the adjacent registration information provided by the reception unit 11 is the communication terminal C managed in the adjacent terminal candidate table 132, and decodes and authenticates this adjacent registration information using the temporal key $TK_{B1}$ indicated by (or associated with) the key identifier $ID_{B1}$ of the decoding key. Upon successful completion of the decoding and authentication, the adjacent terminal registration unit 14 determines that the communication terminal C, which is included in the adjacent registration information, is an adjacent terminal. Then, the adjacent terminal management unit 13 registers and manages (administers) the terminal identifier and security information of the communication terminal C (key $K_C$ and counter value $Counter_C$) in the adjacent terminal table 131.

If the adjacent terminal registration unit 14 of the communication terminal D (first communication terminal) confirms that the transmission source of the adjacent registration information provided by the reception unit 11 is not a communication terminal managed in the adjacent terminal candidate table 132, no processing is performed.

The same processing (steps S108 to S111) is performed for the communication terminals D and H (first communication terminal). Description thereof is omitted to avoid redundancy.

Figure 11:
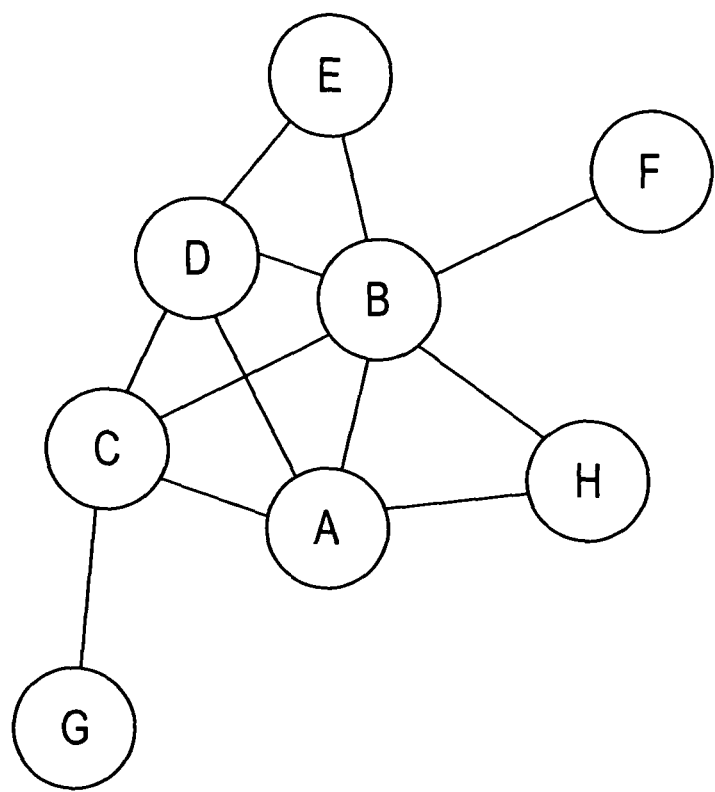
FIG. 11 is a block diagram depicting an established (final) state of the mesh network formed by the participating communication terminals.

By the above mentioned operation, the communication terminal A establishes new safe adjacent relationships with the communication terminals C, D and H, and performs multi-hop communication. FIG. 11 shows the state achieved as a result of the above operation.

As understood from the foregoing description of the embodiment of the present invention, each communication terminal (A) need not repeat mutual authentication with each adjacent candidate communication terminal (C), and each communication terminal (A) need not recognize adjacent terminal devices (C) of each adjacent terminal device (B), but it is still possible to establish adjacent relationships safely and efficiently.

<Modifications>

Some modifications and variations were already described in the foregoing description of the embodiments, but further modifications are also possible, which will be described below.

Although two first communication terminals register each other as an adjacent terminal in the illustrated embodiment, the present invention is not limited in this regard. A one way adjacent relationship is also possible. Specifically, only one first communication terminal may register another first communication terminal as an adjacent terminal.

Although the first communication terminal and the second communication terminal establish a bidirectional safe adjacent relationship with each other in the above-described embodiment, the present invention is not limited in this regard. Only the first communication terminal may register the second communication terminal as a safe adjacent terminal because a safe adjacent relationship can be established with another first communication terminal.

Although the second communication terminal notifies all its adjacent terminal information in the illustrated embodiment, the present invention is not limited in this regard. It is possible that the first communication terminal notifies a list of communication terminals, which the first communication terminal determines as adjacent terminal candidates by a certain method, to the second communication terminal, and the second communication terminal notifies its adjacent terminal information when the second communication terminal recognizes that the communication terminal which has received the above mentioned notice is included in the adjacent terminal list managed by the second communication terminal.

Although the registration processing in the adjacent terminal registration unit 14 of the first communication terminal is limited only for those communication terminals which are included in the adjacent terminal list acquired from the second communication terminals, and which are not managed by the adjacent terminal management unit 13 of the first communication terminal itself in the illustrated embodiment, the present invention is not limited in this regard. All the communication terminals included in the adjacent terminal list acquired from the second communication terminal, for example, may be the target of the registration processing. It is also possible that the first communication terminal manages adjacent terminal candidates by a suitable method in advance, and performs the registration processing for those adjacent terminal candidates which are included in the adjacent terminal list acquired from the second communication terminal and which are already managed by the first communication terminal.

The adjacent terminal registration unit 14 of the first communication terminal may independently determine whether a certain communication terminal is an adjacent terminal candidate or not. In FIG. 1, the communication terminal A and the communication terminal F do not exist in a communicable range, but each has established a safe adjacent relationship with the communication terminal B, therefore in many cases, these communication terminals A and F may be regarded as adjacent terminal candidates. In such a case, if the adjacent terminal registration processing does not progress in the communication terminal A (or F) since adjacent registration information is not received from the candidate terminal F (or A), the communication terminal A (or F) may determine that the candidate communication terminal F (or A) is a communication terminal at a location two hops ahead, and remove this communication terminal F (or A) from the adjacent terminal candidates.

Although each communication terminal shares a circle key with other communication terminals existing in its own communicable range in the above-described embodiment, the present invention is not limited in this regard. For example, all communication terminals participating in the network may share the network key. In this case, it is not always necessary to share a new key to establish a safe adjacent relationship. Thus, only authentication to confirm that this terminal is an adjacent terminal may be executed. A counter value of the network key may be exchanged, instead of sharing a new key, so as to prevent a replay attack.

This application is based on Japanese Patent Application No. 2009-55259 filed on Mar. 9, 2009 and the entire disclosure thereof is incorporated herein by reference.

What is claimed is:

1. A communication method for a mesh network system, said mesh network system including a plurality of communication terminals, which include two first communication terminals and a second communication terminal that is registered as a safe adjacent terminal to the two first communication terminals, an adjacent communication link being establishable between the two first communication terminals to enable wireless multi-hop communication in the mesh network system, the communication method comprising:

a common key distribution step including distributing a common key to all of the plurality of communication terminals in the mesh network system, the common key being a network key that is commonly usable in the mesh network system for at least one of encryption and authentication of data communication among the plurality of communication terminals;

an adjacent terminal list distribution step including distributing, by the second communication terminal to the two first communication terminals, an adjacent terminal list including terminal identifiers of the two first communication terminals, along with a first temporal key generated by the second communication terminal;

an adjacent registration information distribution step including distributing, by one of the first communication terminals, upon receipt of the adjacent terminal list and the first temporal key distributed in the adjacent terminal list distribution step, to the other one of the first communication terminals, adjacent registration information generated using a second temporal key; and an adjacent terminal authentication step including determining, by the other one of the first communication terminals, whether the terminal identifier of the one of the first communication terminals is included in the distributed adjacent terminal list, and whether the distributed first temporal key matches the second temporal key used for generating the distributed adjacent registration information, and authenticating, by the other one of the first communication terminals after said inclusion and said matching are confirmed, the one of the first communication terminals as an adjacent communication terminal for establishing the adjacent communication link between the two first communication terminals, wherein said common key distribution step is performed prior to said adjacent terminal authentication step.

2. The communication method according to claim 1, wherein in the adjacent registration information distribution step the adjacent registration information is encrypted using the second temporal key prior to the distributing of the adjacent registration information, and in the adjacent terminal authentication step the other one of the first communication terminals decodes the adjacent registration information upon receiving the adjacent registration information.

3. The communication method according to claim 1, wherein in the adjacent registration information distribution step the adjacent registration information includes a message authentication code generated using the second temporal key, and in the adjacent terminal authentication step the other one of the first communication terminals authenticates the received adjacent registration information based on the message authentication code.

4. The communication method according to claim 1, wherein in the adjacent registration information distribution step the adjacent registration information includes the terminal identifier of the one of the first communication terminals, and in the adjacent terminal authentication step the other one of the first communication terminals authenticates that the adjacent registration information is information generated by the one of the first communication terminals by recognizing that the terminal identifier of the one of the first communication terminals is included in the received adjacent registration information.

5. The communication method according to claim 1, wherein in the adjacent registration information distribution step the adjacent registration information includes the common key received by the one of the first communication terminals.

6. The communication method according to claim 1, wherein the adjacent registration information further includes counter information for preventing a replay attack based on the common key that is used for data communication between the one of the first communication terminals and the other one of the first communication terminals.

7. The communication method according to claim 1, wherein in the adjacent terminal list distribution step, the adjacent terminal list is encrypted using the common key received by the second communication terminal and is then distributed to the two first communication terminals.

8. The communication method according to claim 7, wherein in the adjacent terminal list distribution step, a message authentication code generated using the common key received by the second communication terminal is distributed along with the adjacent terminal list, and the other one of the first communication terminals authenticates the received adjacent terminal list based on the message authentication code.

9. A mesh network system comprising:

a plurality of communication terminals including two first communication terminals and a second communication terminal that is registered as a safe adjacent terminal to the two first communication terminals, an adjacent communication link being establishable between the two first communication terminals to thereby enable wireless multi-hop communication among the plurality of communication terminals, said second communication terminal having an adjacent terminal list distribution unit for distributing an adjacent terminal list, including terminal identifiers of the two first communication terminals, along with a first temporal key that is generated by the second communication terminal; and a common key distributing unit for distributing, prior to establishing the adjacent communication link between the two first communication terminals, a common key to the first and second communication terminals, said common key being usable among the second communication terminal and the two first communication terminals for at least one of encryption and authentication of data communication among the second communication terminal and the two first communication terminals; wherein one of the first communication terminals has an adjacent registration information distribution unit for distributing adjacent registration information generated using a second temporal key after receiving the adjacent terminal list and the first temporal key from the second communication terminal; and the other one of the first communication terminals has an adjacent terminal authentication unit that, after the other one of the first communication terminals receives the adjacent terminal list and the adjacent registration information from the second communication terminal, authenticates the one of the first communication terminals after confirming that the terminal identifier of the one of the first communication terminals is included in the received adjacent terminal list, and the received first temporal key matches with the second temporal key used for generating the adjacent registration information.

10. A communication terminal that can be used in a mesh network system according to claim 9, comprising:

an adjacent terminal management unit that manages information on communication terminals with which an adjacent relationship is established;

a key information generation unit that generates a temporal key;

a terminal information generation unit that generates adjacent terminal information using the information on the communication terminals with which the adjacent relationship is established and the temporal key; and a transmission unit that transmits the generated adjacent terminal information to another communication unit.

11. A communication terminal that can be used in a mesh network system according to claim 9, comprising:

a reception unit that receives the adjacent terminal information or adjacent registration information generated by another communication terminal;

a terminal information acquisition unit that, when the adjacent terminal information is received, acquires terminal information on a third communication terminal with which an adjacent relationship is established and a first temporal key from the received adjacent terminal information; and an adjacent terminal registration unit that, when the adjacent registration information is received, determines whether the terminal identifier of the another communication terminal is included in the acquired terminal information of the third communication terminal, and whether a first temporal key supplied together with the third communication terminal information matches with a second temporal key used for generating the adjacent registration information, and if both determinations are positive, then registers the third communication terminal as an adjacent communication terminal.

12. The communication terminal according to claim 11, further comprising:

a registration information generation unit that generates adjacent registration information of this communication terminal, using the first temporal key acquired by the terminal information acquisition unit; and a transmission unit that transmits the adjacent registration information to the adjacent terminal.

13. A communication terminal that can be used in a mesh network system according to claim 9, comprising:

an adjacent terminal management unit that manages information on another communication terminal with which an adjacent relationship is established;

a key information generation unit that generates a first temporal key;

a terminal information generation unit that generates adjacent terminal information using the information on the another communication terminal and the first temporal key;

a transmission unit that transmits the generated adjacent terminal information to another communication unit;

a reception unit that receives the adjacent terminal information or adjacent registration information generated by a third communication terminal;

a terminal information acquisition unit that, when the adjacent terminal information is received, acquires information on the another communication terminal and a second temporal key supplied from the received adjacent terminal information;

an adjacent terminal registration unit that confirms, when the adjacent registration information is received, that the terminal identifier of the third communication terminal is included in the acquired information on the another communication terminal and that the first temporal key distributed along with the information of the another communication terminal device matches with a third temporal key to be used for generating the adjacent registration information, whereby the another communication terminal is registered as an adjacent terminal;

a registration information generation unit that generates adjacent registration information of this communication terminal using the second temporal key acquired by the terminal information acquisition unit; and a second transmission unit that transmits the adjacent registration information to the adjacent terminal.

14. A communication method for a mesh network system, said mesh network system including a plurality of communication terminals, which include two first communication terminals and a second communication terminal that is registered as a safe adjacent terminal to the two first communication terminals, an adjacent communication link being establishable between the two first communication terminals to enable wireless multi-hop communication in the mesh network system, the communication method comprising:

an adjacent terminal list distribution step including distributing, by the second communication terminal to the two first communication terminals, an adjacent terminal list including terminal identifiers of the two first communication terminals, along with a first temporal key generated by the second communication terminal;

a common key distribution step for distributing a common key to the first and second communication terminals, said common key being a circle key that is commonly usable among the two first communication terminals and the second communication terminal for at least one of encryption and authentication of data communication among the two first communication terminals and the second communication terminal;

an adjacent registration information distribution step including distributing, by one of the first communication terminals, upon receipt of the adjacent terminal list and the first temporal key distributed in the adjacent terminal list distribution step, to the other one of the first communication terminals, adjacent registration information generated using a second temporal key; and an adjacent terminal authentication step including determining, by the other one of the first communication terminals, whether the terminal identifier of the one of the first communication terminals is included in the distributed adjacent terminal list, and whether the distributed first temporal key matches the second temporal key used for generating the distributed adjacent registration information, and authenticating, by the other one of the first communication terminals after said inclusion and said matching are confirmed, the one of the first communication terminals as an adjacent communication terminal for establishing the adjacent communication link between the two first communication terminals, wherein said common key distribution step is performed prior to said adjacent terminal authentication step.

* * * * *

UNITED STATES PATENT AND TRADEMARK OFFICE
CERTIFICATE OF CORRECTION

PATENT NO. : 8,578,163 B2
APPLICATION NO. : 12/591474
DATED : November 5, 2013
INVENTOR(S) : Taketsugu Yao It is certified that error appears in the above-identified patent and that said Letters Patent is hereby corrected as shown below:

Title Page:

Item (73), should read:

Item (73) Assignee: Oki Electric Industry Co., Ltd., Tokyo (JP)

Signed and Sealed this
Eighteenth Day of March, 2014

Michelle K. Lee
*Deputy Director of the United States Patent and Trademark Office*